United States Patent
Bailey et al.

(10) Patent No.: US 10,189,650 B1
(45) Date of Patent: Jan. 29, 2019

(54) CARD FOR CLEANING PRINTED MEDIA TRANSPORT SYSTEM AND METHOD OF USING SAME

(71) Applicant: KICTeam, Inc., Auburn, ME (US)

(72) Inventors: Glen Bailey, Litchfield, ME (US); Geoffrey Scott Caron, Sabattus, ME (US); Ian McCormick, Yarmouth, ME (US); John Condon, Summer, ME (US); Byron Mehl Kern, II, Cumberland Foreside, ME (US); Kenneth Monroe Pedersen, III, Auburn, ME (US)

(73) Assignee: KICTeam, Inc., Auburn, ME (US)

( * ) Notice: Subject to any disclaimer, the term of this patent is extended or adjusted under 35 U.S.C. 154(b) by 0 days.

(21) Appl. No.: 15/896,336

(22) Filed: Feb. 14, 2018

Related U.S. Application Data

(60) Provisional application No. 62/562,640, filed on Sep. 25, 2017.

(51) Int. Cl.
| | | |
|---|---|---|
| *B08B 13/00* | (2006.01) | |
| *B65G 45/12* | (2006.01) | |
| *B08B 1/02* | (2006.01) | |
| *B08B 1/00* | (2006.01) | |
| *G07F 19/00* | (2006.01) | |

(52) U.S. Cl.
CPC .............. *B65G 45/12* (2013.01); *B08B 1/005* (2013.01); *B08B 1/006* (2013.01); *B08B 1/02* (2013.01); *G07F 19/201* (2013.01); *B65H 2301/531* (2013.01)

(58) Field of Classification Search
None
See application file for complete search history.

(56) References Cited

U.S. PATENT DOCUMENTS

| | | |
|---|---|---|
| 5,153,964 A | 10/1992 | Gelardi et al. |
| 5,861,614 A | 1/1999 | Gardner |
| 6,243,908 B1 | 6/2001 | Battle et al. |
| 7,077,315 B2 | 7/2006 | McCance |

(Continued)

OTHER PUBLICATIONS

Encoded ATM CLeaning Card Product Detail Page; http://www.kicteam.com/en/K2_HEB10; accessed Sep. 21, 2017, 2 pages.

(Continued)

*Primary Examiner* — Eric W Golightly
(74) *Attorney, Agent, or Firm* — Fox Rothschild LLP

(57) ABSTRACT

A system for cleaning a media transport device includes a cleaning substrate sized and configured to fit within at least a portion of a media travel pathway of the transport device. The cleaning substrate includes a cleaning face and a locking member that secures the cleaning substrate in a substantially fixed position within the transport device while the transport device is operated. The cleaning substrate also may include scarifying holes that scrape debris from media conveyors of the transport device, and flaps that fit under and clean belts of the transport device. Cleaning the transport device may include opening a section, positioning the cleaning substrate in the section without operating the media conveyors' motor, closing the section and then operating the transport device so that the media conveyors move, contact the cleaning substrate and are cleaned while the cleaning substrate remains substantially fixed within the transport device.

9 Claims, 9 Drawing Sheets

(56) References Cited

U.S. PATENT DOCUMENTS

| | | |
|---|---|---|
| 7,540,055 B1 | 6/2009 | Bailey |
| 7,846,534 B2 | 12/2010 | Bouchard et al. |
| 8,323,779 B2 | 12/2012 | Bailey et al. |
| 2010/0119765 A1 | 5/2010 | Kabis et al. |

OTHER PUBLICATIONS

Advanced cleaning wizard: Instering a "T" card and adhesive card [US]; http://us.evolis.com/primacy-982-advanced-cleaning-wizard-instering-t-card-adhesive-card-us; accessed Sep. 21, 2017, 2 pages.

CARD FOR CLEANING PRINTED MEDIA TRANSPORT SYSTEM AND METHOD OF USING SAME

RELATED APPLICATIONS AND CLAIM OF PRIORITY

This patent document claims priority to U.S. Provisional Patent Application No. 62/562,640, filed Sep. 25, 2017, the disclosure of which is fully incorporated in to this document by reference.

BACKGROUND

Many machines have media transport mechanisms that receive printed media into the machine and move the media through one or more sections of the machine to perform various processes on the media. For example, a financial transaction terminal such as an automated teller machine may do any or all of the following steps: (i) receive printed currency notes, checks, receipts, coupons, tickets and other printed media; (ii) align the media to an internal reference; (iii) use a camera and/or other sensors to detect what the media is and/or what is printed on the media; (iv) apply additional printed markings to the media; and/or (v) move the media to an appropriate shuttle, bin or exit port. The terminal may perform some or all of these steps, and/or additional steps. Other machines that include media transport mechanisms include coupon printers, ticket printers, ticket-taking devices and other printed media handling systems.

Because printed media can pass through a variety of human hands and environmental conditions before it is inserted into a media transport mechanism, printed media often is at least partially coated with dirt, oil and/or other contaminants. When the printed media passes through the media transport mechanism, the contaminants can transfer from the printed media to the mechanism's rollers, belts, other conveyors, and other components that contact the printed media. Over time, these contaminants can build up and cause the machine to malfunction.

The removal of contaminants from a media transport mechanism is a labor-intensive and, time-consuming process. It requires a technician to open the device and carefully clean small parts by hand. Many of these parts are in small, hard-to-reach spaces. Thus, manual cleaning is difficult, and it is not always effective.

This document describes methods and systems directed to solving some of the issues described above, and/or other issues.

SUMMARY

In an embodiment, a cleaning system for cleaning a currency transport device includes a cleaning substrate sized and configured to fit within at least a portion of a media travel pathway of a currency transport device. The cleaning substrate includes a cleaning face and a locking member configured to be positioned inside the currency transport device to secure the cleaning substrate in at least one substantially fixed position within the currency transport device while the currency transport device is operated. Optionally, the locking member may include a tab connected to the cleaning substrate; the tab may include a first receptacle; and the tab may extend away from the substrate so that, when positioned in the currency transport device, the first receptacle of the tab will be positioned to align with a first post of the currency transport device to secure the cleaning substrate within the media travel pathway in a first substantially fixed position. Optionally, the tab also may include a second receptacle positioned to align with a second post of the currency transport device to secure the cleaning substrate in a second substantially fixed position. Optionally, the cleaning substrate may include one or more scarifying holes, each of which is positioned to align with a drive roller, an idle roller, a drive roller/idle roller pair, or a belt of the currency transport device when the cleaning substrate is in a corresponding one of the fixed substantially fixed positions. Optionally, the cleaning substrate may further include one or more scrapers, each of which is attached to at least one edge of one of the scarifying holes and extends inwardly from the at least one edge toward the center of that scarifying hole. Optionally, the cleaning substrate may include flaps configured to fit under a plurality of belts of the currency transport device. Optionally, the cleaning substrate may include at least one hole configured to align with a sensor of the currency transport device. Optionally, the cleaning substrate may include a latching flap configured to fit within a slot of the currency transport device to retard forward or backward movement of the first cleaning substrate while the cleaning substrate is within the currency transport device. Optionally, the cleaning substrate may include a cleaning solution disposed on at least a portion of the cleaning face.

In an alternate embodiment, a cleaning system for cleaning a media transport device includes a cleaning substrate sized and configured to fit within a portion of a media travel pathway of a media transport device. The cleaning substrate includes a locking member configured to be positioned to secure the cleaning substrate in at least one substantially fixed position within the media travel pathway while the media transport device is operated. The cleaning substrate also includes one or more of the following: (a) a scarifying hole positioned and configured to receive a drive roller and/or idle roller of the media transport device so that an edge of the scarifying hole will scrape debris or other contaminants from the roller during operation of the media transport device; or (b) one or more flaps positioned and configured to fit under one or more belts of the media transport device. Optionally, the locking member may include a tab connected to the cleaning substrate, the tab may include a first receptacle, and the tab may extend away from the substrate so that, when positioned in the media transport device, the first receptacle of the tab will be positioned to align with a first post of the media transport device to secure the cleaning substrate within the media travel pathway. Optionally, the cleaning substrate also may include one or more scrapers, each of which is attached to at least one edge of one of the scarifying holes and extends inwardly from the at least one edge toward the center of that scarifying hole. Optionally, the cleaning substrate may include at least one hole configured to align with a sensor of the media transport device. Optionally, the cleaning substrate includes a latching flap configured to fit within a slot of the media transport device to retard forward or backward movement of the first cleaning substrate while it is within the media transport device. Optionally, the latching flap may serve as, or may be part of, the locking member. Optionally, the cleaning substrate may further include a cleaning solution disposed on at least a portion of the cleaning face.

In an alternate embodiment, a method of cleaning a media travel pathway of a media transport device includes opening at least a first section of a media transport device that includes belts, rollers and/or other media conveyors. The method also includes positioning a first cleaning substrate in the first section without operating a motor that actuates the media conveyors. The method also includes closing the first section so that at least some of the media conveyors contact the first cleaning substrate. The method also includes operating the media transport device so that the media conveyors move, contact the first cleaning substrate and are cleaned while the first cleaning substrate remains substantially fixed within the first section of the media transport device. Optionally, opening the first section creates a first portal that is not accessible during operation of the motor of the media transport device, and placing the first cleaning substrate in the first section comprises accessing the section through the first portal. Optionally, the method also may include opening the first portal to remove the first cleaning substrate from the first section. Optionally, before opening the first section, the method may include operating the motor and, while operating the motor, placing a second cleaning substrate into a second portal that is accessible during operation of the motor so that (i) the second cleaning substrate is received into, and moves through the media transport device, and (ii) the second cleaning substrate contacts the media conveyors while the second cleaning substrate moves through the media transport device. Optionally, if the first cleaning substrate includes scarifying holes, the positioning step may include aligning the scarifying holes to at least some of the media conveyors. Optionally, if the first cleaning substrate has multiple alignment positions. positioning the first cleaning substrate in the first section may include positioning the first cleaning substrate in a first one of the alignment positions, and after operating the media transport device the method may include: (i) opening the first section; (ii) repositioning the cleaning substrate to a second position in the first section according to a second one of the alignment positions; (iii) closing the first section; and (iv) operating the media transport device again so that at least some of the media conveyors turn, contact the cleaning substrate and are further cleaned while the cleaning substrate remains substantially fixed in the second position. Optionally, before operating the media transport device, the method may include: (i) opening a second section of the media transport device; (ii) positioning a second cleaning substrate in the second section without operating the motor; (iii) closing the second section so that at least some media conveyors in the second section contact the second cleaning substrate; and (iv) operating the media transport device may include causing the belts or rollers in the second section to turn, contact the second cleaning substrate and be cleaned while the second cleaning substrate remains substantially fixed within the second section of the media transport device. Optionally, positioning the cleaning substrate in the section may include placing the cleaning substrate in the section and securing the substrate within the section by: (a) connecting a locking member of the cleaning substrate to a post of the media transport device; or (b) by the closing of the first section, causing the second section to apply sufficient pressure to the cleaning substrate that the cleaning substrate is held by friction against interior components of the first section.

DETAILED DESCRIPTION

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

In this document, terms that are descriptive of position such as "upper" and "lower", "horizontal", "vertical" and the like are intended to indicate relative positions with respect to the components for which those terms are descriptive, and are not intended to be absolute and require that the component remain in that absolute position in all configurations. Except where specifically stated otherwise, numeric descriptors such as "first", "second", etc. are not intended to designate a particular order, sequence or position in an overall process or schema, but instead are simply intended to distinguish various items from each other by describing them as a first item, a second item, etc.

The terms "media transport system" and "media transport device" refer to a set of hardware components that are configured to receive printed media (i.e., a substrate onto which text and/or graphics have been printed) and move the printed media through one or more modules that perform various processing steps on the printed media, such as position adjustment, sensing, printing and/or delivery to a final destination. A "currency transport device" or "currency transport system" is a type of media transport device that is configured to process and convey printed financial instruments such as currency notes, checks, money orders, bank notes and the like.

In this document the terms "substantially fixed" and "substantially stationary" refer to objects that do not move through a travel pathway but remain within a single location in the travel pathway. An object may vibrate, flex or even wiggle or be jostled while remaining "substantially fixed" or "substantially stationary" so long as it is not moving through the media transport system to different positions within the travel pathway. The terms "substantially fixed" and "substantially stationary" therefore include, but are not limited to, completely fixed and stationary positions.

Figure 1A:
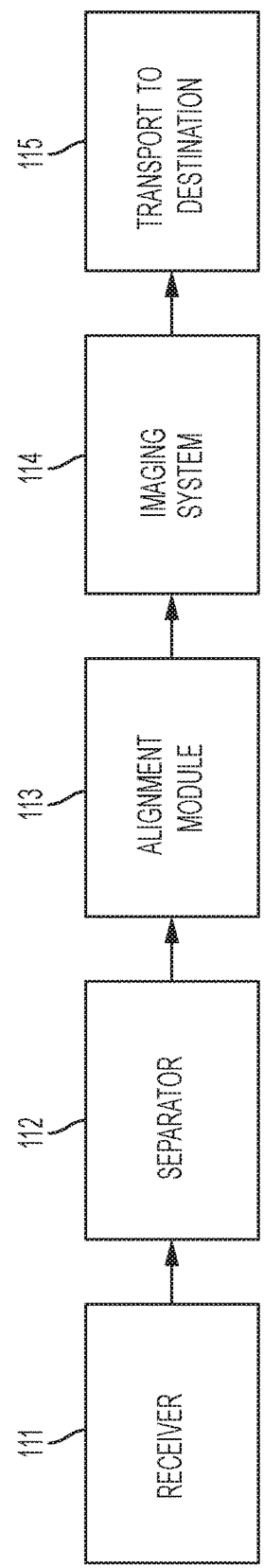
FIG. 1A illustrates example components of a media transport system, such as may exist in a prior art automated teller machine or ticket taking machine, in block diagram format.
Figure 1B:
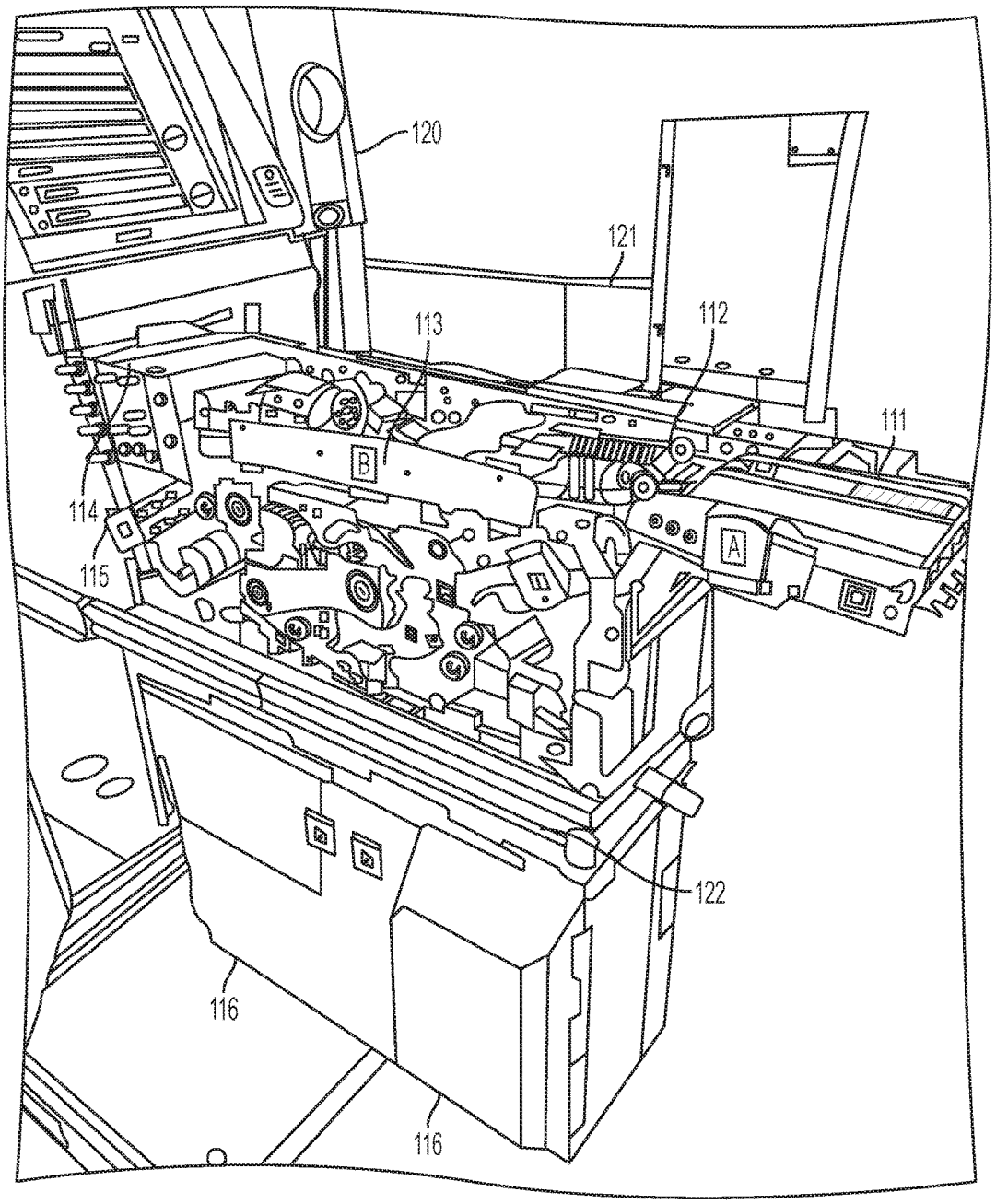
FIG. 1B illustrates an example of an automated teller machine that includes the components shown in FIG. 1A.

FIG. 1A is a block diagram that illustrates example components of a media transport system, such as may exist in a prior art automated teller machine or ticket taking machine. FIG. 1B illustrates an example of an automated teller machine that includes the components shown in FIG.

1A. The machine includes a housing 120 that contains the media transport system. As shown in FIG. 1B, optionally the housing may include a door 121 and one or more extendible rails 122, shuttles, or other movable mechanisms that may be used to remove at least part of the media transport system from the housing 120.

The media transport system includes components such as a receiver 111 that includes belts, rollers or other conveying mechanisms that will receive printed media into the system via an opening in the housing. The media transport system also may include a separator module 112 that includes belts, rollers or other media conveyor devices that separate stacked printed media, such as stacked checks or currency notes. The media transport system also may include an alignment module 113 that includes belts, rollers or other conveying mechanisms that will adjust a position of the media with respect to an internal reference point. The media transport system also may include an imaging system 114 with a camera and/or other sensors and associated programming that can detect what the media is and/or what is printed on the media. The media transport system also may include a transport module 115 with one or more belts, rollers or other media conveyors that will move the printed media to an appropriate destination 116 such as a shuttle, bin or exit port. The media transport system also may include other modules, such as a printer that can apply additional printed markings to the printed media. The areas within each module through which the printed media passes form a media travel pathway from the receiver's intake to the final destination.

Figure 2:
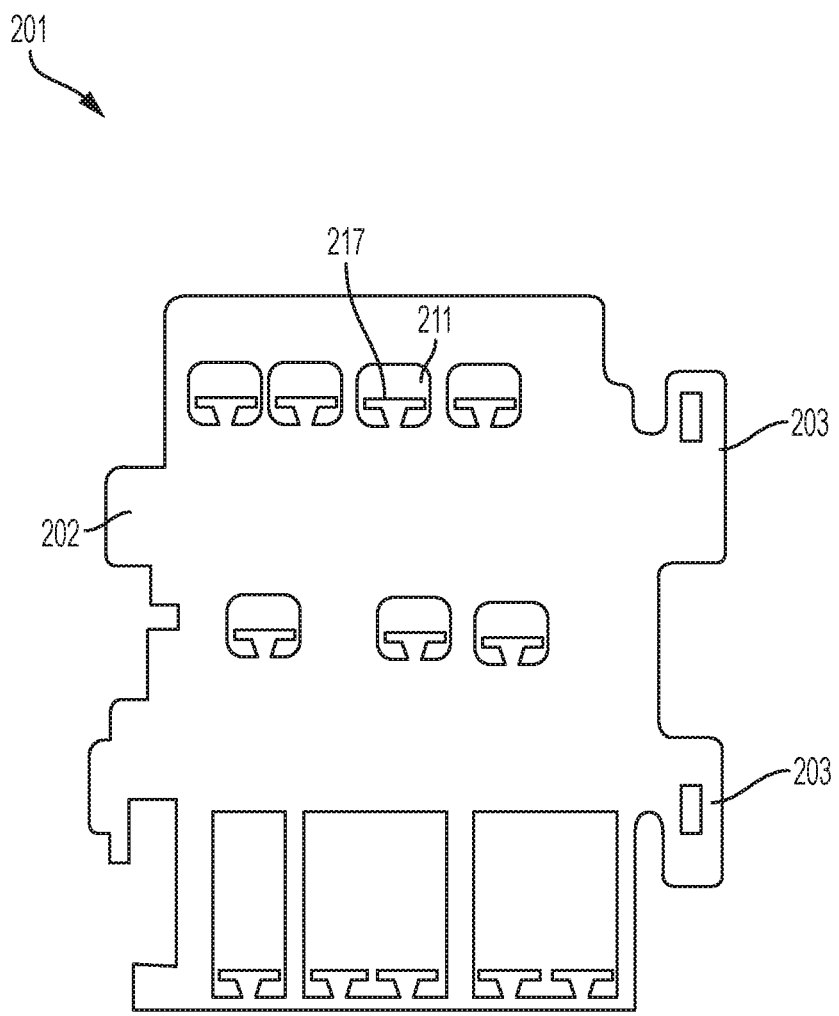
FIG. 2 illustrates a first example configuration of a cleaning substrate with scarifying holes and locking members.

FIG. 2 illustrates an example of a cleaning system that includes a cleaning substrate 201, which sometimes may be referred to as a cleaning card, that may be used to clean various components of a media transport system such as that shown in FIGS. 1A and 1B. The cleaning substrate includes a cleaning face 202 (which as shown is an upper face) and an opposing face (not shown, since it is under cleaning face 202) that may or may not also be a cleaning face. At least one of the cleaning faces may be coated with a cleaning solution such as a solvent so that internal components of the media transport system may be cleaned when the components move along or across the cleaning face of the substrate. Example cleaning solutions include isopropyl alcohol, deionized water, alkaline surfactants, and other materials or combinations of these. Alternatively, a cleaning face may be textured or made of fiber that will promote friction when a movable object is moved against the cleaning face. The cleaning substrate may be made of a flexible, tear-resistant material such as a fibrous aramid or meta-aramid fabric material such as that marketed under the NOMEX® brand; a cellulosic material; a flexible polymeric substrate provided with thin, non-woven layers made of absorbent material such as that marketed under the SONTARA® brand; a sponge made of polyurethane or other type of foam; or a combination of any of these, such as a sponge coated with a fabric, non-woven absorbent or cellulosic material.

The cleaning substrate also includes one or more locking members 203 such as holes, slots and/or tabs that are configured to align with (such as by fitting over or locking into) a stationary component of the media transport such as a post. Each locking member 203 is a structure that will hold the cleaning substrate 201 in place in a substantially fixed position within the media travel pathway while moving parts of the media transport system pass over or along the cleaning substrate and are cleaned.

In the example shown in FIG. 2, the locking members 203 may be tabs that extend from the cleaning face 202, and each of the tabs may include a receptacle that is positioned to align with a post of the media transport device. If the media transport device includes multiple posts, or if the substrate includes multiple locking members 203 such as in the example shown in FIG. 2, the receptacles of the locking members 203 of FIG. 2 may be placed over various posts so that the cleaning substrate can be used in multiple positions in the transport system. In an alternate example shown in FIG. 3, the cleaning substrate 301 may include a locking member 303 with multiple receptacles 304, 305, each of which is positioned to align with a post of the media transport device (which may be a single post, or multiple posts) so that the cleaning substrate may be aligned in multiple positions within the media travel pathway of the media transport system. Alternatively or in addition to a locking member, the cleaning substrate may be held substantially fixed by friction within the media travel pathway when the pathway is closed. This may happen, for example, if the cleaning substrate is at least at thick or thicker than the closed media travel pathway so that the cleaning substrate contacts interior components of the media travel pathway and is held against those components by friction. A cleaning substrate made of a compressible foam core and fabric or other abrasive cover may be useful in such an embodiment.

The cleaning substrate has a length and width that is sized and shaped to fit within the media travel pathway of the transport device with which the cleaning substrate is intended to be used, and the locking tabs will be positioned to connect to the posts or other connecting structures of the transport device with which the cleaning substrate is intended to be used. As used in this document, the term "fit within" does not necessarily mean that the substrate is entirely held within the media travel pathway, as a locking tab or other relatively small portion of the substrate may extend from the media travel pathway into other areas of the interior of the transport device. However, in some optional embodiments the cleaning substrate will be retained completely within the media travel pathway. In some optional embodiments, no portion of the substrate will extend from a media acceptor port (such as a currency acceptor slot) of the transport device.

Figure 3:
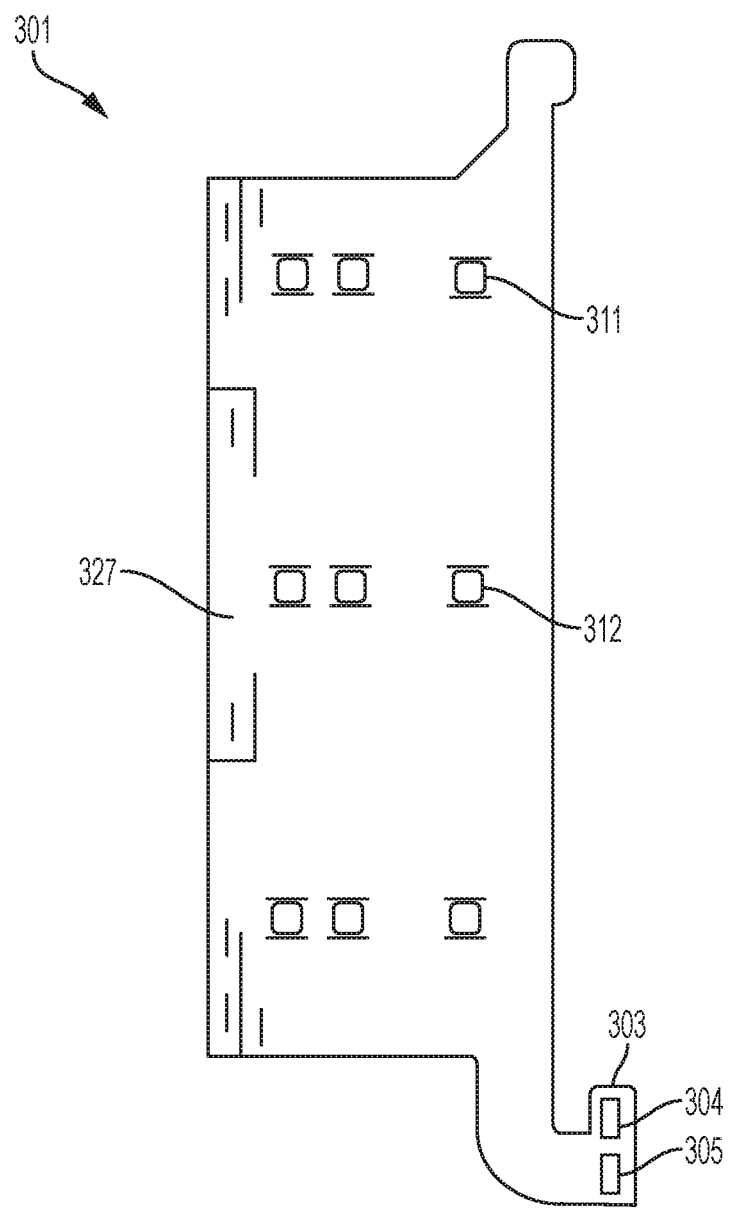
FIG. 3 illustrates another example configuration of a cleaning substrate with scarifying holes and a locking member.
Figure 4:
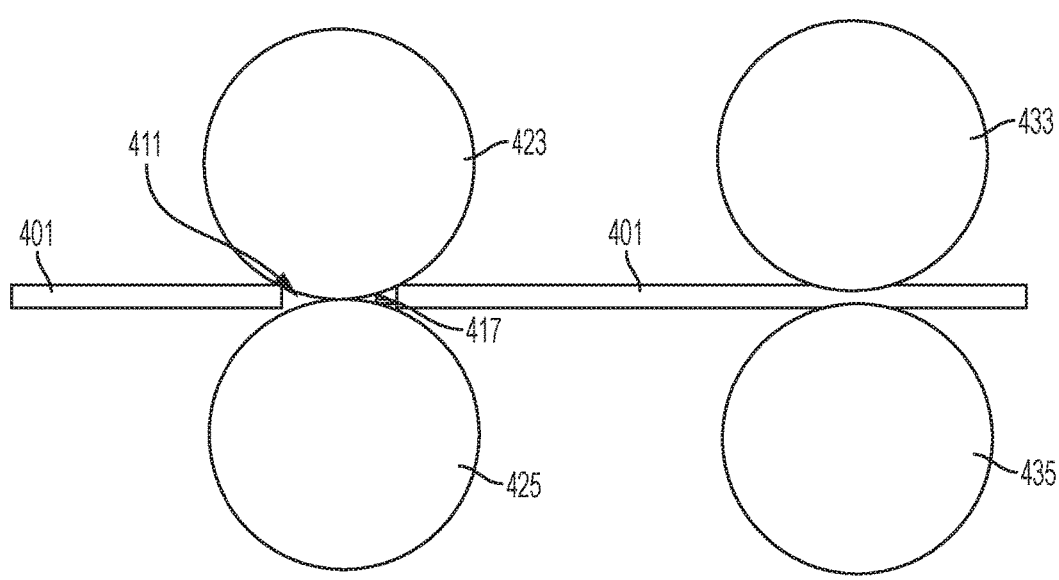
FIG. 4 illustrates a process by which a cleaning substrate may clean rollers of a media transport system.

In addition, referring to FIG. 3, the cleaning substrate will include multiple scarifying holes 312, 313 that are positioned to align over, under, or in between rollers of the media transport device. A scarifying hole is an opening created and positioned to provide a scraping edge against which another item may be scraped so that debris or other contaminants on the item's surface are scraped and thus removed via movement of the hole, the item or both. Referring to FIG. 4, the substrate 401 includes a scarifying hole 411 sized and positioned to fit between an idle roller 423 and drive roller 425 of the media transport system. In normal operation when the media transport system receives printed media, the drive roller 425 presses against the media, and a motor turns the drive roller 425 to move the media through the media travel pathway. The idle roller 423 is positioned proximate to the drive roller 425 to serve as a backstop for the force of the drive roller 425. The printed media passes between the idle roller 423 and drive roller 425. In a cleaning operation, the drive roller 425 is activated but the cleaning substrate remains stationary, anchored in the transport path by the locking structure(s). The scarifying hole 411 receives the idle roller 423 and/or the drive roller 425 so that one or both rollers scrape along the edges of the scarifying hole 411 and are thus cleaned. In configurations that only use a drive roller without an idle roller, the drive roller may be received into the scarifying hole.

The drive rollers and/or idle rollers of other drive roller 435/idle roller 433 pairs that are not aligned with the scarifying hole 411 will be wiped by the cleaning substrate. Then, when the cleaning substrate is moved to a different stationary position in the media transport path (and a different locking member receptacle or media transport system post is used to lock the cleaning substrate in the different position) the other drive roller 435/idle roller 433 pair may be aligned with the scarifying hole 411 or a different scarifying hole in the substrate.

Scarifying holes also may be sized and positioned to align with and accept one or more belts or other moving parts of the media travel pathway. For example, referring to FIG. 5, one or more axles 522, when activated, turn a belt 525 while the cleaning substrate remains stationary in the media travel pathway. If the scarifying hole has a width that smaller than, or at least no greater than, the width of the belt 525, the belt 525 will be scraped by the scarifying hole 511 and wiped by the cleaning substrate 501. In addition, if the scarifying hole 511 is positioned to align with the axle 522, the axle 522 may help push a segment of the belt 525 into the scarifying hole 511 to promote scraping of the belt 525 along the edge of the scarifying hole 511.

Figure 5:
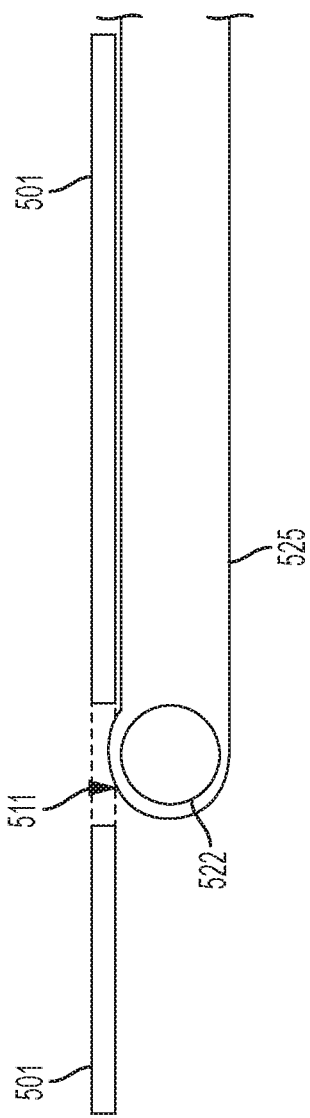
FIG. 5 illustrates a process by which a cleaning substrate may clean a belt of a media transport system.
Figure 6:
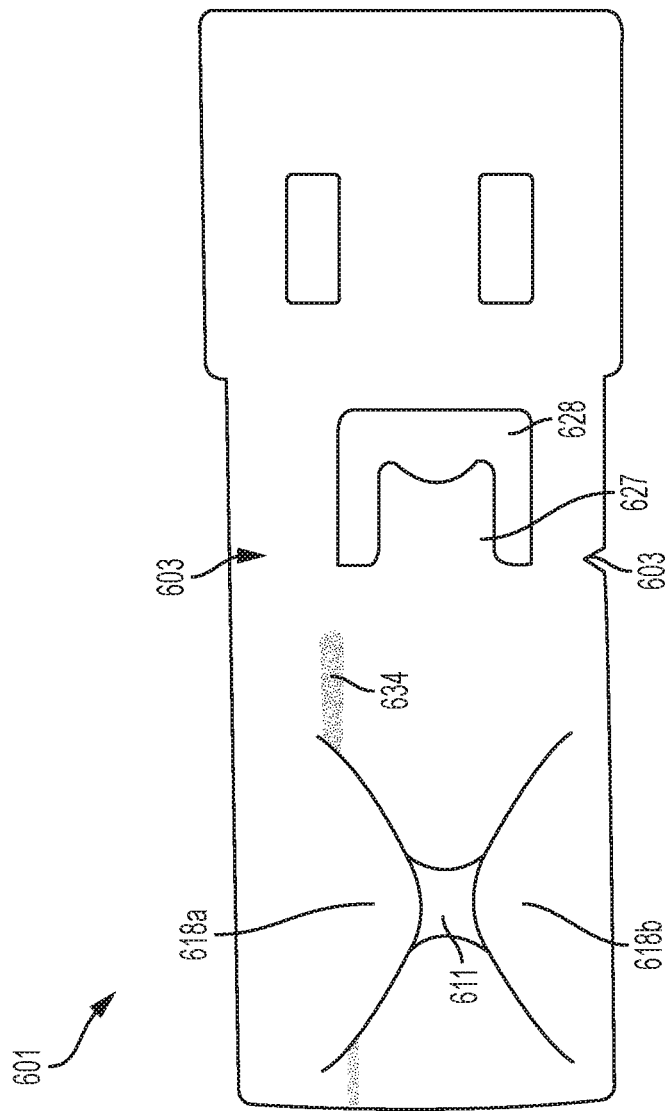
FIG. 6 illustrates another example configuration of a cleaning substrate, with flaps for use in cleaning a belt.

FIG. 6 illustrates an alternative to FIG. 5 in which, as an alternative to (or in addition to) a scarifying hole, a belt scraper is formed by one or more inwardly-facing flaps 618a, 618b that may be lifted upward or pressed downward so that the belt may be placed under or over each flap. Each flap 618a, 618b will have at least one side that is attached to the cleaning substrate and at least one edge that is cut away from the substrate so that it can be lifted or pressed and receive the belt. The edge may be a single curved edge as shown, or multiple angled edges may be used. As the belt is operated, the cut-away edge of the flap will scrape the belt. The face of the cleaning substrate also may wipe the belt. In addition, both sides of the belt may brush across the cleaning surface of the substrate and the flap as the belt passes over the substrate and under the flap (or over the flap and under the substrate). This may result in the deposit of dirt, oil or other contaminants 634 on the cleaning substrate, as shown in FIG. 6. Optionally, the flaps 618a, 618b may be adjacent to a scarifying hole 611. In some embodiments, the flaps 618a, 618b may serve as locking members to hold the cleaning substrate in a substantially fixed position by contact with the belts during operation. The embodiment of FIG. 6 also illustrates an embodiment with additional locking members 603 that are each an inwardly-facing slot into which a post of the media transport system may be placed.

Figure 7:
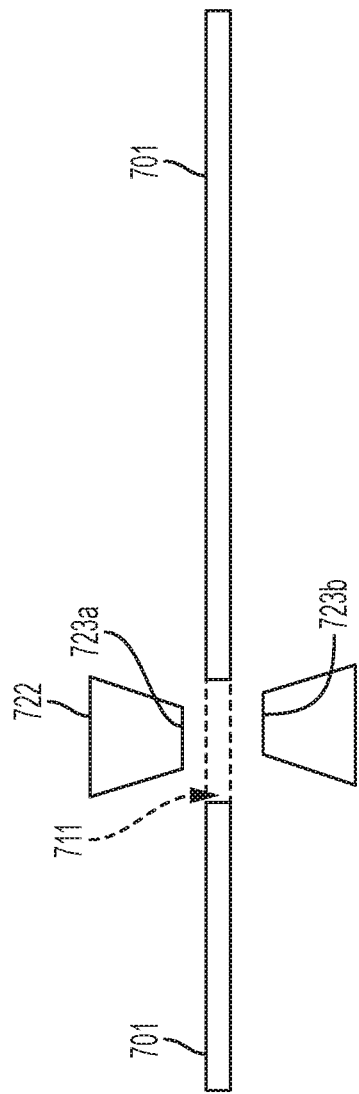
FIG. 7 illustrates how sensors may be used with a cleaning substrate.

Referring to FIG. 7, in some embodiments scarifying holes or other holes 711 of the cleaning substrate 701 also may be sized and positioned to align with one or more sensors 722 within the media travel pathway. Such a sensor 722 may include a pressure sensor, an optical sensor, a temperature sensor, and/or any other sensor that is available in the media transport system and may, in some embodiments, include a transmitter 723a and receiver 723b as is shown in FIG. 7. The media transport device may use the sensor 722 to detect the position of the cleaning substrate 701 within the media travel pathway (e.g., based on pressure or optical data determine whether the sensor is over a scarifying hole). In addition, in some media transport systems one or more sensors 722 may be used to detect whether the device is jammed and media is not moving through the media travel pathway. If so, the placement of a scarifying hole 711 or other hole under such a sensor can help avoid the media transport system stopping. The sensor can detect whether or not the cleaning substrate is in a proper cleaning position, rather than mis-aligned or jammed, because if the hole 711 not been positioned under the sensor 722, the sensor 722 would have detected the presence of the non-moving substrate and thus detected that the cleaning substrate is not moving through the device.

Referring back to FIG. 2, in some embodiments one or more of the scarifying holes 211 may include a scraper 217 that is attached to one or more edges of the scarifying hole. The scraper 217 extends inwardly toward the center of the scarifying hole 211. Referring to FIG. 4, depending on whether the alignment of the scraper 417 is positioned closer to an upper face, closer to a lower face, or centrally within the scarifying hole, the scraper may provide additional scraping force against the idle roller 423 and/or the drive roller 425.

Referring back to FIG. 3, in some embodiments the cleaning substrate 301 may include any number of forward-facing or reverse-facing flaps 327, shown here as forward-facing flaps formed by cuts made into the cleaning substrate 301, that are positioned along a forward-facing edge (i.e., facing the direction of media travel in the media travel pathway) of the cleaning substrate. The flap 327 can be sized and positioned to fit within a slot of the media transport device to help retard forward or reverse movement of the cleaning substrate 301 in the media travel pathway and further anchor the cleaning substrate 301 in a stationary position during the cleaning operation. FIG. 6 illustrates another embodiment in which the forward-facing flap 627 is not on a leading edge of the substrate but instead is on a forward-facing edge of within an opening 628 within the cleaning substrate. The flap 627 also may, in some embodiments, serve as or be part of a locking member.

In various embodiments, a cleaning system may include multiple cleaning substrates that are sized, shaped, and which contain scarifying holes and locking structure to align within different modules of the media transport system. For example, a first cleaning substrate 201 such as that shown in FIG. 2 may be placed within the alignment module of a media transport device while the device is idle, and a second cleaning substrate 301 such as that shown in FIG. 3 may be placed within the receiving module of the media transport device while the device is idle. The media transport device may then be operated, and each of the modules will be cleaned at the same time.

In some embodiments, the cleaning face(s) of the cleaning substrate may be textured to provide additional cleaning function (e.g., by applying friction to belts that pass over the cleaning substrate). The cleaning face(s) also may include a material such as a meshed loop structure that entangles dirt to trap it.

Figure 8:
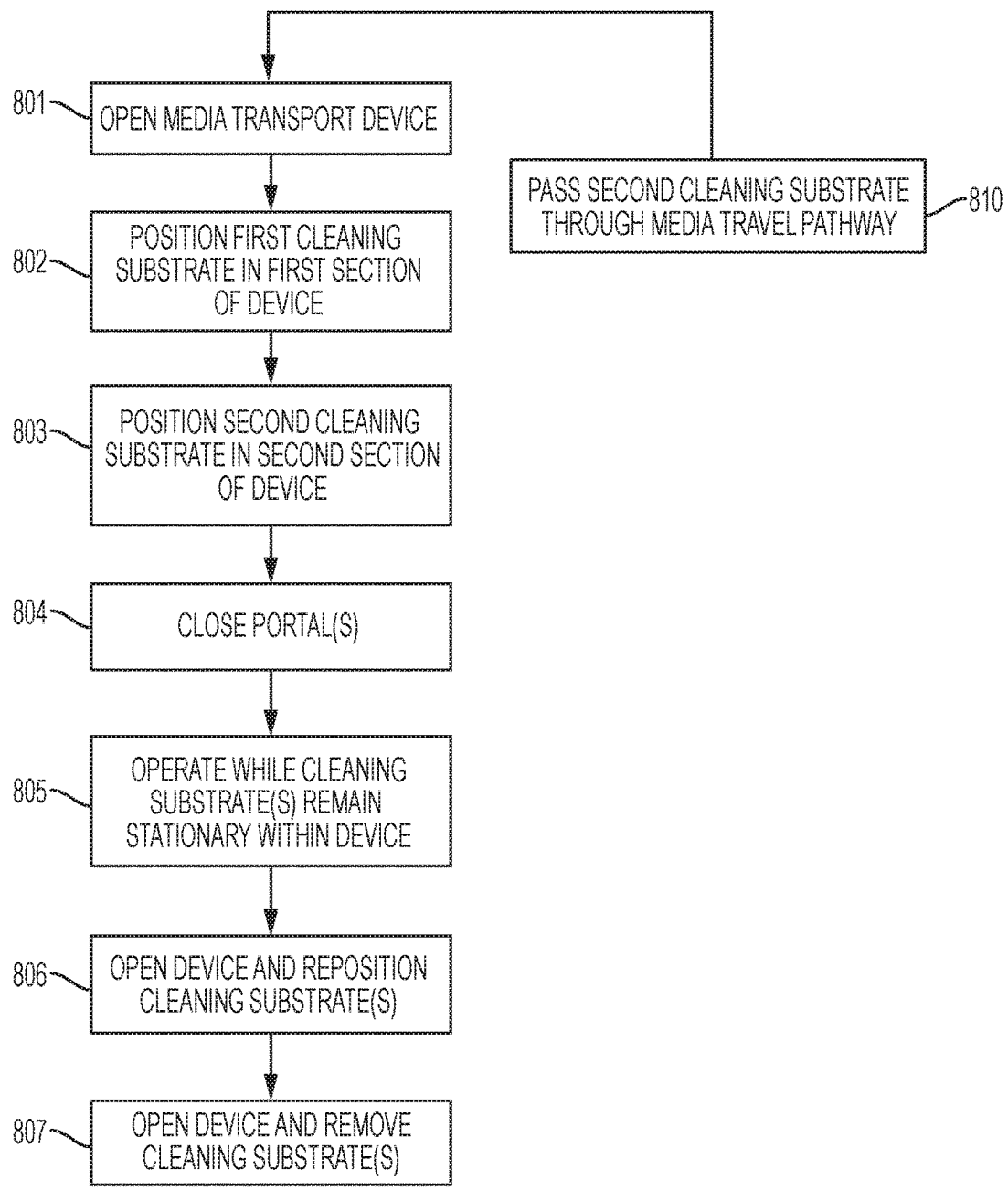
FIG. 8 is a flow diagram illustrating a method of using a cleaning system of a type consistent with that shown by way of example in FIGS. 2-7.

FIG. 8 further illustrates a method of using a cleaning system such as that described above. The method includes opening the media transport device to form a portal into which a first cleaning substrate may be placed (step 801). The portal will be a portal that is not accessible during normal operation of the device. For example, the portal will not be a currency acceptor slot that is used during normal operation to insert currency into the media transport device. Instead, the portal will be formed by opening one or more of the modules that form the media travel pathway. The cleaning substrate will be inserted into a media travel pathway of the media transport device through the portal, and the cleaning substrate will be placed into a fixed position without operating the motor that actuates the media conveyors (i.e., belts and/or rollers) of the media transport device (step 802).

If the cleaning substrate includes scarifying holes, the scarifying holes may be aligned to rollers, belts, sensors and/or other selected components of the media transport device that are in the media travel pathway. If the cleaning substrate includes one more flaps for cleaning a belt, one or more belts may be positioned over or under the flap(s). If the cleaning substrate includes a locking member, the locking member may be aligned with a post within the media travel pathway. If the cleaning substrate includes a latching flap, the latching flap may be placed within a slot in the media travel pathway.

A first section of the media transport device will thus receive the cleaning substrate through the portal. The cleaning substrate may remain fully within the media travel pathway. Alternatively, a portion of the cleaning substrate may extend out from the media travel pathway, such as through a currency acceptor slot, so long as enough of the cleaning substrate remains within the pathway to provide a cleaning function.

Optionally, one or more additional cleaning substrates may be placed into additional sections of the media travel pathway of the media transport device (step 803) as described above.

The portal to the first section will then be closed (step 804) so that at least some of the belts or rollers contact the first cleaning substrate. The media transport device will then be turned on and operated so that the belts or rollers move, contact the first cleaning substrate and are cleaned while the first cleaning substrate remains substantially fixed within the first section of the media transport device (step 805). The device will then be turned off (i.e., powered down or moved to an idle mode in which the belts and rollers of the media travel pathway are not operated), and portal(s) will be opened to remove the cleaning substrate(s) from the media travel pathway (step 807).

Optionally, before opening the first section and placing the cleaning substrate through the portal, the method may include operating the media transport device and, while operating the motor, placing a second cleaning substrate (step 810) that includes a cleaning solution into a second portal that is accessible during operation of the motor so that the second cleaning card is received into, and moves through the media transport device, and the cleaning solution contacts the belts or rollers while the second cleaning substrate moves through the media transport device. In this way, cleaning solution may be applied to the media travel pathway before the stationary card is inserted, and the stationary card may then require little or no cleaning solution. This also may help pre-clean the components of the media travel pathway before the stationary cleaning substrates are inserted.

Optionally, after operating the media transport device so that the belts or rollers turn, contact the first cleaning substrate and are cleaned (step 805), the method may include opening the portal to expose access to a section of media travel pathway and repositioning the cleaning substrate to a second position in the section according to a second alignment positions (step 806). That portal may then be closed, and the media transport device will be again operated so that at least some of the belts or rollers turn, contact the cleaning substrate and are further cleaned while the cleaning substrate remains substantially fixed in the second position.

The methods and systems described above may result in significant time savings as compared to manual cleaning. In addition, they can help ensure that cleaning occurs in small and/or hard-to-reach segments within the media transport device.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A cleaning system for cleaning a currency transport device comprising:
    a cleaning substrate sized and configured to fit within at least a portion of a media travel pathway of a currency transport device, wherein the cleaning substrate comprises:
        a cleaning face; and
        a locking member configured to be positioned inside the currency transport device to secure the cleaning substrate in at least one substantially fixed position within the currency transport device while the currency transport device is operated, wherein:
            the locking member comprises a tab connected to the cleaning face and extends away from the cleaning face so that, when the cleaning face is positioned in the media travel pathway, the tab will extend outside of the media travel pathway to another area of the currency transport device; and
            the tab includes a first receptacle that is positioned to, when placed in the currency transport device, align with a first post of the currency transport device to secure the cleaning substrate within the media travel pathway in a first substantially fixed position.

2. The cleaning system of claim 1, wherein the tab also comprises a second receptacle positioned to align with a second post of the currency transport device to secure the cleaning substrate in a second substantially fixed position.

3. The cleaning system of claim 1, wherein the cleaning substrate comprises a plurality of scarifying holes, each of which is positioned to align with a drive roller, an idle roller, or a drive roller/idle roller pair of the currency transport device when the cleaning substrate is in a corresponding one of the substantially fixed positions.

4. The cleaning system of claim 3, wherein the cleaning substrate further comprises one or more scrapers, each of which is attached to at least one edge of one of the scarifying holes and extends inwardly from the at least one edge toward the center of that scarifying hole.

5. The cleaning system of claim 1, wherein the cleaning substrate comprises a plurality of flaps configured to fit under a plurality of belts of the currency transport device.

6. The cleaning system of claim 1, wherein the cleaning substrate comprises one or more scarifying holes, each of which is configured to align with one or more belts of the currency transport device.

7. The cleaning system of claim 1, wherein the cleaning substrate comprises at least one hole configured to align with a sensor of the currency transport device.

8. The cleaning system of claim 1, wherein the cleaning substrate comprises a latching flap configured to fit within a slot of the currency transport device to retard forward or backward movement of the cleaning substrate while it is within the currency transport device.

9. The cleaning system of claim 1, wherein the cleaning substrate further comprises a cleaning solution disposed on at least a portion of the cleaning face.

* * * * *